US009363355B2

(12) United States Patent
Ryu

(10) Patent No.: US 9,363,355 B2
(45) Date of Patent: Jun. 7, 2016

(54) WIRELESS TERMINAL ADAPTED TO CONTROL BROADCAST IN EXTERNAL DEVICE

(75) Inventor: Kyung-Min Ryu, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 496 days.

(21) Appl. No.: 13/326,925

(22) Filed: Dec. 15, 2011

(65) Prior Publication Data

US 2013/0009746 A1   Jan. 10, 2013

(30) Foreign Application Priority Data

Jul. 4, 2011   (KR) .................. 10-2011-0066156

(51) Int. Cl.
   *G05B 19/02*   (2006.01)
   *H04M 1/725*   (2006.01)
   *H04N 21/41*   (2011.01)

(52) U.S. Cl.
   CPC ........ *H04M 1/72533* (2013.01); *H04M 1/7253* (2013.01); *H04N 21/4126* (2013.01)

(58) Field of Classification Search
   USPC ......................................................... 340/4.3
   See application file for complete search history.

(56) References Cited

U.S. PATENT DOCUMENTS

| 5,410,326 | A  |   | 4/1995  | Goldstein |
|---|---|---|---|---|
| 2001/0055951 | A1 | * | 12/2001 | Slotznick ........................ 455/41 |
| 2005/0235334 | A1 |   | 10/2005 | Togashi et al. |
| 2006/0193471 | A1 |   | 8/2006  | Stehle |
| 2008/0288284 | A1 | * | 11/2008 | Leichner et al. .................. 705/2 |
| 2009/0193471 | A1 | * | 7/2009  | Rodriguez ...................... 725/60 |
| 2011/0037609 | A1 | * | 2/2011  | Kim et al. ................ 340/825.22 |
| 2011/0046755 | A1 | * | 2/2011  | Sung et al. ..................... 700/90 |
| 2012/0050012 | A1 | * | 3/2012  | Alsina et al. ................. 340/10.1 |
| 2015/0155959 | A1 |   | 6/2015  | Chun |

FOREIGN PATENT DOCUMENTS

| CN | 101247488 A | 8/2008 |
|---|---|---|
| WO | 01/97495 A1 | 12/2001 |
| WO | 2004/088916 A1 | 10/2004 |

* cited by examiner

*Primary Examiner* — Brian Zimmerman
*Assistant Examiner* — Thomas McCormack
(74) *Attorney, Agent, or Firm* — Cha & Reiter, LLC.

(57) ABSTRACT

Provided is a wireless terminal and method therefor, configured to play a broadcast program (TV and/or radio) in a broadcast mode thereof. A display unit displays, during the broadcast mode, at least one icon dedicated to automatically controlling an external device to output the same broadcast as that of a current channel in the broadcast mode. A controller is configured to detect selection of the at least one icon and in response, to transmit via a wireless communication unit at least one command to the external device to automatically tune to a corresponding channel of the current channel and output the same broadcast thereof. The external control by the wireless terminal can enable uninterrupted switching of the broadcast from the wireless terminal to the external device.

16 Claims, 5 Drawing Sheets

WIRELESS TERMINAL ADAPTED TO CONTROL BROADCAST IN EXTERNAL DEVICE

CLAIM OF PRIORITY

This application claims the benefit under 35 U.S.C. §119(a) of a Korean Patent Application filed in the Korean Intellectual Property Office on Jul. 4, 2011 and assigned Serial No. 10-2011-0066156, the entire disclosure of which is hereby incorporated by reference.

BACKGROUND OF THE INVENTION

1. Field of the Invention

The present invention relates to wireless communication/multimedia terminals.

2. Description of the Related Art

Modern wireless terminals are equipped with various additional functions as well as a communication function. The additional functions may include a Digital Multimedia Broadcasting (DMB) function which receives and displays current or live TV broadcasts, and a radio function for receiving and playing a radio broadcast. Thus users can watch TV or listen to the radio anywhere by using the wireless terminal's DMB or radio function.

In the home environment, a wireless terminal user might watch TV or listen to the radio through the DMB or radio function of the wireless terminal while sitting in the backyard or on the porch. Inside the house, however, the user typically selects larger equipment, such as a television or a high powered stereo, as the audio/video (A/V) entertainment device of choice.

SUMMARY OF THE INVENTION

At least one aspect of the present invention is premised on the recognition of a scenario in which a user may be watching TV or listening to the radio on a wireless terminal through the DMB or radio function in the home environment outside the house. When this user then moves inside the house, she may desire to immediately view/listen to the same TV or radio program on a television/stereo system without interruption. In this case, she may experience the inconvenience of having to terminate the DMB or radio function of the wireless terminal and then, operate the TV or stereo equipment to find the same broadcast that is currently broadcast on the wireless terminal.

Accordingly, an aspect of the present invention is to provide a wireless terminal configured with capability of controlling an external device such as a TV, such that a broadcast currently output in a broadcast mode of the wireless terminal, can be output through the external device (i.e., "switched over" to the external device) in an uninterrupted manner.

Another aspect of the present invention is to provide a wireless terminal configured to control an external device such that content, which is currently output in a content output mode of the wireless terminal, can be output and controlled through the external device via a remote control operation.

In an aspect, a wireless terminal is configured to output a broadcast in a broadcast mode thereof. The wireless terminal includes: a display unit configured to display, during the broadcast mode, at least one icon dedicated to automatically controlling an external device to output the same broadcast as that of a current channel of the broadcast mode; a wireless communication unit; and a controller configured to detect selection of the at least one icon and in response, to transmit via the wireless communication unit at least one command to the external device to automatically tune to a corresponding channel of the current channel and output the same broadcast thereof.

The at least one icon can comprise an external device power-on and channel shift icon. Upon selecting this icon, the at least one command is transmitted to control both an automatic power-on of the external device and the tuning to the corresponding channel to output the broadcast thereof.

In another aspect, a method implemented in a wireless terminal comprises: outputting a broadcast of a current channel in a broadcast mode of the wireless terminal; displaying at least one icon dedicated to automatically controlling an external device to output the same broadcast as that of the current channel; and, upon detecting selection of the at least one icon, transmitting at least one command to the external device to automatically tune to a channel corresponding to the current channel and output the same broadcast thereof.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION

Hereinafter, exemplary embodiments of the present invention will be described in detail with reference to the accompanying drawings. It should be noted that like symbols indicate like components throughout the drawings.

Figure 1:
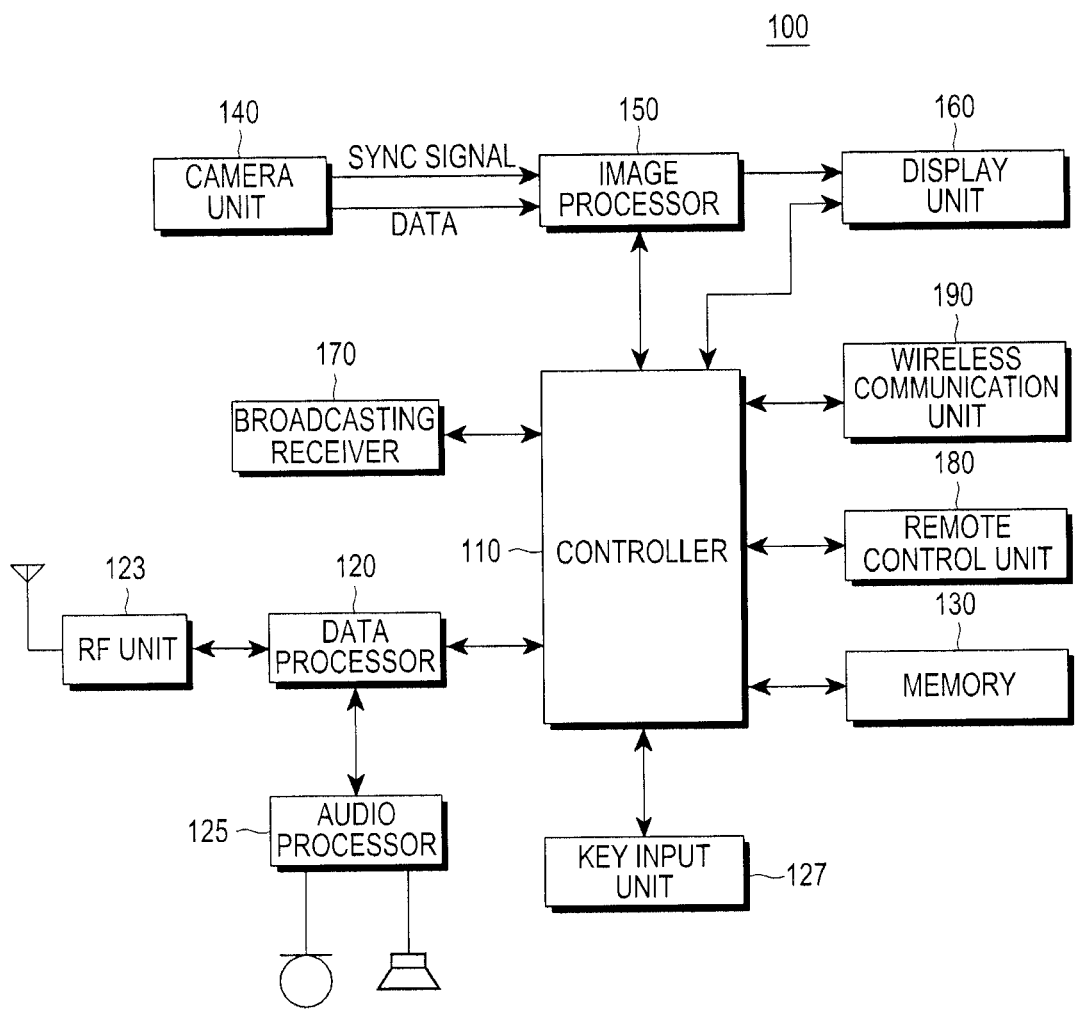
FIG. 1 is a block diagram of a wireless terminal according to an exemplary embodiment of the present invention.

FIG. 1 is a block diagram of a wireless terminal, 100, according to an exemplary embodiment of the present invention. As will be explained in more detail hereafter, wireless terminal 100 is configured to operate in a broadcast mode in which a broadcast of a current channel is output. The broadcast mode can be, e.g., a DMB mode in which the broadcast is output by displaying a television (TV) program on a display unit 160. The broadcast can also be a radio broadcast or a web broadcast. In any case, while the broadcast is output, the display unit 160 displays at least one icon which is dedicated to automatically controlling an external device such as a television, to play (output) the same broadcast as that of the current channel of the mobile terminal broadcast mode. When a user selects the icon, a controller 110 detects the selection and transmits at least one command via a wireless communication unit 190 to the external device commanding it to automatically tune to a channel corresponding to the current channel and thereby output the same broadcast. Thus, the icon selection enables the user to shift his viewing of the broadcast (or purely listening in the case of a radio broadcast) from the wireless terminal to the external device, without interruption.

Referring still to FIG. 1, wireless terminal 100 can be embodied as a smart phone, a tablet device, a PDA, a laptop, a netbook device, and so forth. A Radio Frequency (RF) unit 123, in conjunction with a data processor 120, audio processor 125 and controller 110, perform a wireless communication function of wireless terminal 100. The RF unit 123 includes an RF transmitter for up-converting a frequency of a transmission signal and amplifying the transmitted signal and an RF receiver for low-noise amplifying a received signal and down-converting the frequency of the received signal. The data processor 120 includes a transmitter for encoding and modulating the transmission signal and a receiver for demodulating and decoding the received signal. Thus the data processor 120 may include a modem and a codec. Here, the codec includes a data codec for processing packet data and an audio codec for processing an audio signal such as voice. Audio processor 125 reproduces an audio signal being output from the audio codec of the data processor 120 or transmits an audio signal generated from a microphone to the audio codec of the data processor 120.

The controller 110 controls the overall operation of the wireless terminal 100. A key input unit 127 includes physical or virtual keys for inputting numeric and character information and physical or virtual function keys for setting various functions.

A memory 130 includes program and data memories. The program memory stores one or more programs for controlling a general operation of the wireless terminal. The program memory further stores one or more programs for generating commands to be transmitted to an external device to command the external device to output the same broadcast as a currently output broadcast of the wireless terminal 100.

In an embodiment, the memory 130 stores channels of the external device which correspond to channels selectable in a broadcast mode of the wireless terminal. For example, if the external device is a television, it may receive broadcast signals through a different means or service provider than that of the wireless terminal 100. Thus, the channel numbers of the external device may differ from those of the wireless terminal 100. The memory 130 stores the corresponding channels of the external device to allow the wireless terminal 100 to instruct the external device to tune to the correct channel carrying the desired broadcast to be played. These corresponding channels may be automatically or manually set in the memory 130.

Figure 3:
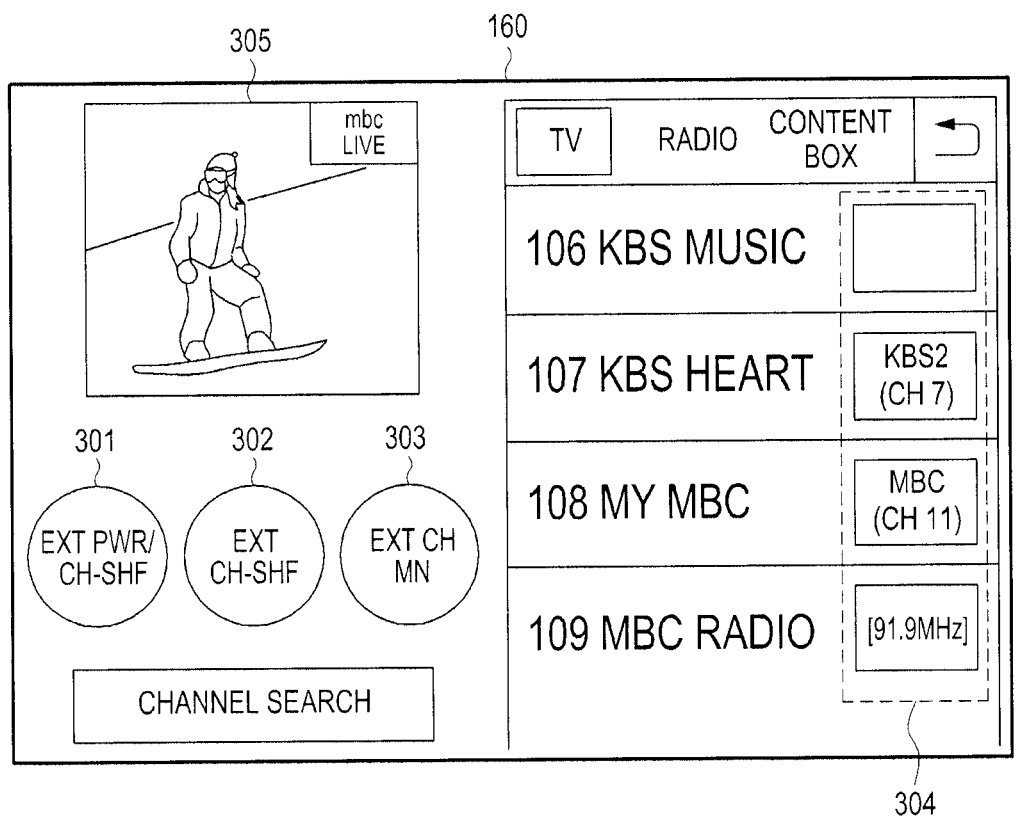
FIG. 3 is an example of a display screen in a wireless terminal of a broadcast along with selectable icons to control a broadcast in an external device.

As mentioned above, as the wireless terminal 100 plays a broadcast in the broadcast mode, i.e., as a broadcast is output in a current channel, the display unit 160 displays at least one icon which is dedicated to automatically controlling an external device to play (output) the same broadcast. Referring temporarily to FIG. 3, an example of a display screen of the display unit 160 is shown with two selectable icons, 301 and 302, each dedicated to controlling a broadcast in an external device. The first is an External Device Power-On and Channel Shift icon 301, which when selected, causes the controller 110 to transmit commands to automatically power on the external device in a remote control mode, and controls broadcasting of the same channel as the channel of the currently output broadcasting to be output through the external device. Thus, two commands are transmitted: one to power on the external device and the other to automatically shift the external device channel to the one corresponding to the current channel to which the wireless device is tuned.

In an embodiment variation, icon 301 also serves to carry out an external device power-off function. In this case, if a second touch input is detected at the icon 301, controller 110 transmits a command to power off the external device.

The second icon is an External Device Channel Shift icon 302, which is dedicated for external device channel control while the external device has already been powered on. Thus, if the external device of interest has already been powered on and is currently broadcasting a program, the user can select icon 302 to switch the program to the current broadcast of the wireless terminal 100. The controller 110 responds to the selection by switching to the remote control mode, and transmitting a command to control broadcasting currently output through the external device. Thus, selecting icon 302 results in the same channel shift function being carried out as when icon 301 is selected; however, selecting icon 302 does not power-on the external device.

Another external device control icon displayed on the display screen broadcast mode example of FIG. 3 is an External Device Manual Channel icon 303. When icon 303 is selected, the controller 110 switches to the remote control mode, and controls broadcasting currently output through the external device in the remote control mode to be changed into broadcasting of a preset channel or a channel input by a user and the changed broadcasting to be output through the external device.

It is noted here that in a preceding display screen (not shown) to that shown in FIG. 3, a generic menu selection or icon can be displayed and labeled such as an External Device Output. In this option, when the user selects External Device Output, the result can be a display screen change to display the three icons 301, 302, 303.

In another variation, only one icon 301 (or only icons 301 and 303) may be generated and displayed. In this case, icon 301 can perform the function of icon 302 when the external device is already powered on. That is, the first of the two transmitted commands associated with icon 301, i.e., the automatic power-on command, will not carry out any operation since the external device is already turned on. Meanwhile, the second transmitted command, i.e., the channel shift command, will perform the same function described previously of shifting the external device channel to the channel corresponding to the current wireless terminal broadcast channel.

In an embodiment, external device broadcast channels corresponding to broadcast mode channels in the wireless terminal 100, can be displayed alongside the latter channels on display unit 160 under the control of the controller 110. In this case, the controller 110 controls the channel information of the external device, which is set to correspond to the channels of the broadcast mode, to be modifiable by the user and allows the user to input the channel information of the external device for the channels of the broadcast mode in which the channel information of the external device is not displayed.

In an embodiment, the broadcast mode includes a DMB mode and a radio mode, and the external device includes any device, such as a TV or an Audio/Video (AV) system, which can output the broadcasting currently output in the wireless terminal.

In an embodiment, upon selection of External Device Output when content is output in a content output mode of the wireless terminal, the controller 110 switches to the remote control mode. The controller 110 transmits the content currently output in the content output mode to the external device in the remote control mode for output through the external device, and controls the content output through the external device. The content may include video data and audio data.

With continuing reference to FIG. 1, a broadcasting receiver 170 receives broadcasting of a selected channel, and may include a DMB receiver and a radio receiver.

A remote control unit 180 performs a remote control function for controlling an operation of the external device, and controls the external device's operation through a wireless communication unit 190. Remote control unit 180 is shown separate from controller 110; however, it can be embodied as a hardware portion of controller 110 or as a program running on controller 110. Herein, functions performed by remote control unit will be interchangeably described as being performed by controller 110.

The wireless communication unit 190 is used to perform the remote control function of the remote control unit 180, and may use a wireless communication protocol such as Infrared Data Association (IrDA), WiFi, or Bluetooth. In an embodiment, bidirectional data communication is performed beforehand between wireless communication unit 190 and the external device using a suitable protocol. During this communication, the external device can provide wireless terminal 100 with the appropriate format of signals (frequencies, codes, signal strength, etc.) suitable to remotely control functions such as power-on, power-off, channel shifting, volume, etc., for that particular external device. With this approach, each time wireless terminal 100 comes within the vicinity of a particular external device, it can detect its presence and automatically set up its remote control functionality to correspond to that device. (For example, an icon representing the external device detected can be displayed on the display unit 160, thereby apprising the user which external device is currently controllable.)

In an alternative implementation, wireless communication unit 190 transmits signals equivalent to those transmitted by a universal remote controller. In this option, external devices of different manufacturers can be controllable by wireless terminal 100 without any prior data communication with wireless terminal 100.

A camera unit 140 captures an image, and may include a camera sensor for converting an optical signal of the captured image into an electrical signal, and a signal processor for converting an analog image signal of the image captured by the camera sensor into digital data. Examples of camera sensor types include a Charge Coupled Device (CCD) sensor or a Complementary Metal Oxide Semiconductor (CMOS) sensor. The signal processor may be implemented as a Digital Signal Processor (DSP). In addition, the camera sensor and the signal processor may be integrated as one unit or implemented separately.

An image processor 150 performs Image Signal Processing (ISP) to display an image signal output from the camera unit 140 on the display unit 160. The ISP executes functions such as gamma correction, interpolation, space conversion, image effect, image scale, Auto White Balance (AWB), Auto Exposure (AE) and Auto Focus (AF). Thus, the image processor 150 processes the image signal output from the camera unit 140 in the unit of a frame, and outputs frame image data adaptively to the features and size of the display unit 160. The image processor 150 includes an image codec, and compresses the frame image data displayed on the display unit 160 in a preset manner or restores the compressed frame image data to the original frame image data. Herein, the image codec may be Joint Picture Experts Group (JPEG) codec, Moving Picture Experts Group 4 (MPEG4) codec, or Wavelet codec. It is assumed that the image processor 150 has an on screen display (OSD) function. The image processor 150 may output OSD data according to the displayed picture size under the control of the controller 110.

The display unit 160 displays an image signal output from the image processor 150 on a screen thereof, and displays user data output from the controller 110. Herein, the display unit 160 may be a Liquid Crystal Display (LCD), and in this case, the display unit 160 may include an LCD controller, a memory capable of storing image data, an LCD element, and so on. When the LCD is implemented with a touch screen, it may serve as an input unit. In this case, on the display unit 160, keys such as the key input unit 127 may be displayed.

The electronics within two or more, and optionally all of the components 110, 120, 123, 125, 130, 140, 150, 160, 170, 180 and 190 can be implemented within a single integrated circuit package.

In an embodiment, the display unit 160 may display the selection menus for External Device Output in the broadcast mode, and the selection menus for External Device Output include External Device Power-On/Channel Shift, External Device Channel Shift, and External Device Manual Channel.

In an embodiment, the display unit 160 may display channel information of the external device, which is set to correspond to each channel of the broadcast mode, in the broadcast mode.

In an embodiment, the display unit 160 may display an External Device Output menu for outputting content through the external device during output of the content in the content output mode.

Hereinafter, the operation of continuously outputting broadcasting, which is currently output in the wireless terminal, through the external device will be described in detail with reference to FIGS. 2 and 3, and the operation of outputting and controlling content, which is currently output in the wireless terminal, through the external device will be described in detail with reference to FIGS. 4 and 5.

Figure 2:
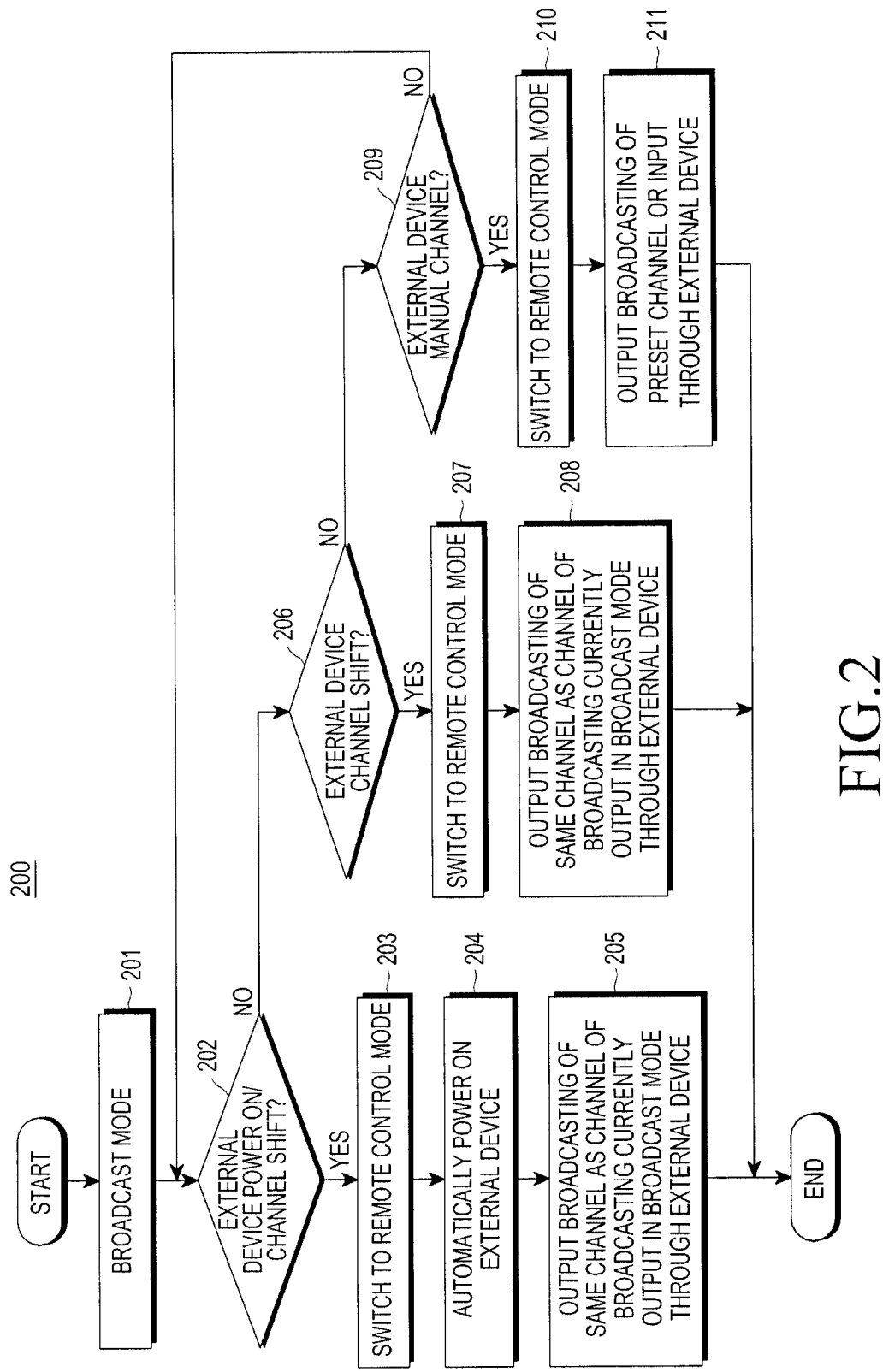
FIG. 2 is a flowchart illustrating a process by which the wireless terminal controls an external device to output the same broadcast as currently output by the wireless terminal, according to an exemplary embodiment of the present invention.

FIG. 2 is a flowchart illustrating a process, 200, by which a wireless terminal controls an external device to output the same broadcast as currently output by the wireless terminal, according to an exemplary embodiment of the present invention. FIG. 3 is an example of a display screen in wireless terminal 100 displaying a broadcast along with selectable icons to control a broadcast in an external device. FIG. 3 will be referred to in describing the process illustrated in FIG. 2.

Referring to FIG. 2 with reference also to the components/features of FIGS. 1 and 3, in step 201 which is the broadcast mode of the wireless terminal, broadcasting of a channel selected through the display unit 160 is output. If a user selects a "View Channel" icon (e.g., "Channel Search" of FIG. 3) while watching a broadcast in a full screen on the display unit 160, the display unit 160 outputs broadcasting of the selected channel on a predetermined region 305. Also displayable are channels which can be selected in the broadcast mode (e.g., "106 KBS MUSIC") and selection icons 301 through 303 for External Device Output, as shown in FIG. 3.

If the user selects External Device Power-On/Channel Shift 301, the controller 110 senses the selection in step 202 and switches to a remote control mode in step 203. The controller 110 also automatically powers on the external device in step 204, and extracts channel information of the external device, which corresponds to the channel currently output in the broadcast mode as shown in FIG. 3, from the memory 130 and controls broadcasting of the same channel as a channel of the broadcasting currently output in the broadcast mode to be output through the external device in step 205.

Through steps 201 through 205, in an example scenario, when the user watching DMB through the wireless terminal outside the house enters the house, by merely selecting the External Device Power-On/Channel Shift 301 displayed on the display unit 160 in front of a powered-off TV, a remote control function may be executed such that the TV can be automatically powered on and broadcasting of the same channel as a channel of the broadcasting currently output through the wireless terminal can be automatically output through the TV.

If the user selects External Device Channel Shift 302 from among the selection menus for External Device Output in the broadcast mode, the controller 110 senses the selection in step 206 and switches to the remote control mode in step 207. The controller 110 also: i) extracts channel information of the external device, which corresponds to the channel currently output in the broadcast mode as shown in FIG. 3, from the memory 130; ii) generates commands instructing the external device to change broadcasting currently output through the external device into broadcasting of the same channel as a channel of broadcasting currently output in the broadcast mode of the wireless terminal; and iii) controls the changed broadcasting to be output through the external device by transmitting the commands thereto via wireless communication unit 190, in step 208.

Through steps 206 through 208, in an example scenario, when the user watching DMB through the wireless terminal outside the house enters the house, by merely selecting External Device Channel Shift 302 displayed on the display unit 160 in proximity to a powered-on TV, a remote control function may be executed such that the same broadcast currently output through the wireless terminal, can be automatically output through the TV.

If the user selects External Device Manual Channel 303 from among the selection menus for External Device Output in the broadcast mode, the controller 110 senses the selection in step 209 and switches to the remote control mode in step 210.

In this remote control mode, the controller 110 determines whether there is channel information preset by the user, regardless of the broadcasting currently output in the broadcast mode of the wireless terminal, and if the preset channel information exists, the controller 110 changes the broadcasting currently output through the external device into broadcasting of the preset channel and controls the changed broadcasting to be output through the external device in step 211. If there is no channel information preset by the user, the controller 110 receives channel information for output through the external device from the user, changes the broadcasting currently output through the external device into broadcasting of the channel input by the user, and controls the changed broadcasting to be output through the external device in step 211. (Manual channel inputs from the user can be received, e.g., via repeated touch input of icon 303; via touch inputs of left, right, up or down portions of icon 303, or via touch input through other icons or keys following selection of icon 303.)

Through steps 209 through 211, in an example scenario, when the user watching DMB through the wireless terminal outside the house enters the house, by merely selecting External Device Manual Channel 303 displayed on the display unit 160 in proximity to the powered-on TV, the user can automatically execute a remote control function such that the broadcasting of the preset or desired channel can be automatically output through the TV.

As shown in FIG. 3, on the display unit 160 may be displayed the channels selectable in the broadcast mode, and the channels may include channel information 304 to be output through the external device.

The channel information 304 to be output through the external device may be automatically set, or manually set by the user. In the case of manual setting, a switch to a modify mode may be made by touching corresponding channel information among the displayed channel information 304 to be output through the external device, and the user may modify the corresponding channel information. For a channel of the broadcasting mode, which has no channel information 304 to be output through the external device, the switch to a modify mode may be made by touch input at particular channel information among the displayed channel information 304, and the user may directly input channel information.

The channels of the broadcast mode displayed in FIG. 3 include both TV channels and radio channels. Therefore, when an operation of outputting, during listening to broadcasting through selection of a radio channel, broadcasting of the same radio channel as the selected radio channel, broadcasting of a preset radio channel, or broadcasting of a radio channel input by the user through the external device such as an AV system may also be performed in the same manner as shown in FIG. 2.

Figure 4:
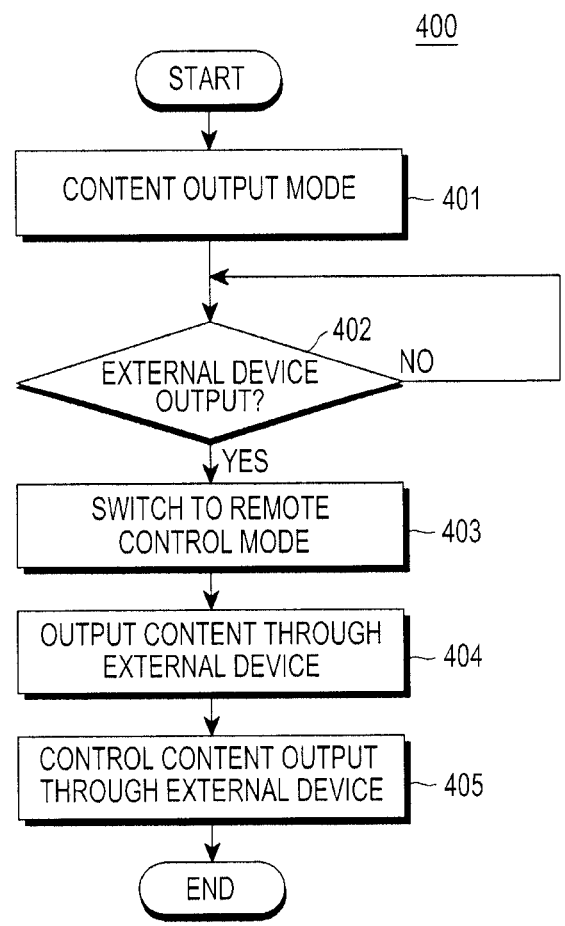
FIG. 4 is a flowchart illustrating a process of outputting and controlling content, which is currently output from a wireless terminal, through an external device according to an exemplary embodiment of the present invention.
Figure 5:
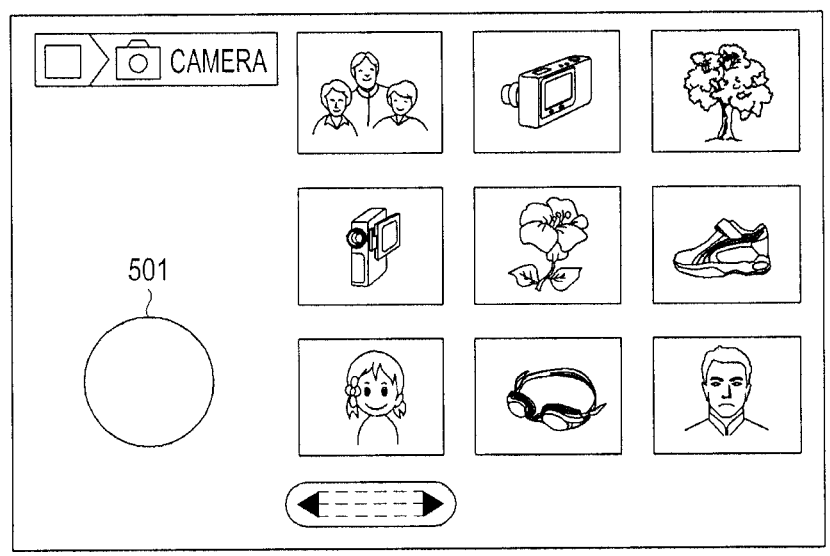
FIG. 5 is an example of a display screen of a wireless terminal for describing the process illustrated in FIG. 4.

FIG. 4 is a flowchart illustrating a process, 400, of outputting and controlling content, which is currently output from the wireless terminal, through the external device according to an exemplary embodiment of the present invention, and FIG. 5 is an example of a display screen for facilitating understanding the process illustrated in FIG. 4. Referring to FIG. 4 with reference to the components/features of FIGS. 1 and 5, if External Device Output is selected when content is output in step 401 which is a content output mode of the wireless terminal 100, the controller 110 senses the selection in step 402 and switches to a remote control mode in step 403.

The controller 110 also outputs the content, which is currently output in the content mode, through the external device in step 404 and controls the content output through the external device in step 405.

FIG. 5 shows the display unit 160 which displays video data and an External Device Output icon 501 in the content output mode.

If the External Device Output icon 501 displayed together with the video data is selected in FIG. 5, the controller 110 automatically switches to the remote control mode in which the controller 110 transmits the video data displayed on the display unit 160 to the external device through the wireless communication unit 190 and controls the video data to be output through the external device.

If during output of audio data in the content output mode, the External Device Output icon 501, which is displayed on the display unit 160 together information about the currently output audio data, is selected, the controller 110 automatically switches to the remote control mode in which the controller 110 transmits the audio data, which is currently output in the wireless terminal, to the external device through the wireless communication unit 190 and controls the audio data to be output through the external device.

As can be seen from the foregoing description, by providing the functionality of the described wireless terminal electronics and method for controlling the external device in the wireless terminal 100, broadcasting, currently output in the wireless terminal, can be output through the external device without interruption, from the perspective of the viewer/listener. In addition, the content currently output in the wireless terminal can be output through the external device, thereby conveniently controlling the content. Moreover, a convenient function can be provided without addition of a part or an additional cost, improving product satisfaction.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While detailed exemplary embodiments have been described in the present description, various changes may be made to these exemplary embodiments without departing from the scope of the present invention. Accordingly, the scope of the present invention should be defined by the claims and equivalents thereof, rather than the described embodiments.

What is claimed is:

1. A wireless terminal, comprising:
    a display unit configured to display content of a selected channel from a plurality of channels associated with the wireless terminal;
    a memory configured to store the plurality of channels associated with the wireless terminal, and a plurality of channels associated with an external device; and
    a controller configured to:
        access the memory and select a particular channel of the plurality of channels associated with the external device, the particular channel of the plurality of channels corresponding to the selected channel; and
        transmit at least one command to the external device to tune the external device to the particular channel, such that the content that is being displayed is output on the external device,
    wherein the content is received at the wireless terminal over the selected channel and the command instructs the external device to tune to the particular channel, wherein the particular channel is different from the selected channel.

2. The wireless terminal of claim 1, wherein the display unit is configured to further display at least one menu for receiving a user command to shift an initial channel of the external device to the particular channel corresponding to the at least one selected channel, on a predetermined region, when a menu view is selected while displaying the content of the selected channel, and wherein upon selection of external device power-on and channel shift from the at least one menu, the controller switches to a remote control mode, and automatically powers on the external device.

3. The wireless terminal of claim 2, wherein upon selection of the channel shift from the at least one menu, the controller switches to a remote control mode, and controls the external device to change channels.

4. The wireless terminal of claim 2, wherein upon selection of external device manual channel from the at least one menu, the controller switches to a remote control mode, and controls the external device to switch to a preset channel or a channel input by a user.

5. The wireless terminal of claim 1, wherein the content is displayed in a broadcast mode of the wireless terminal, and the broadcast mode comprises a Digital Multimedia Broadcasting (DMB) mode or a radio mode.

6. The wireless terminal of claim 2, wherein upon selection of external device output from the at least one menu when the content is displayed in a content output mode of the wireless terminal, the controller switches to a remote control mode and controls the content output through the external device.

7. The wireless terminal of claim 6, wherein the content of the selected channel is video data or audio data.

8. A method for controlling an external device in a wireless terminal, the method comprising:
    displaying content of a selected channel from a plurality of channels associated with the wireless terminal at the wireless terminal;
    accessing a memory, wherein the memory stores the plurality of channels associated with the wireless terminal, and a plurality of channels associated with the external device; and
    controlling by transmitting at least one command to the external device to tune the external device to a particular channel of the plurality of channels, such that the content that is being displayed at the wireless terminal is output on the external device,
    wherein the content is received at the wireless terminal over the selected channel and the command instructs the external device to tune to the particular channel, wherein the particular is different from the selected channel.

9. The method of claim 8, further comprising:
    displaying at least one menu for receiving a user command to shift an initial channel of the external device to the particular channel corresponding to the at least one selected channel, on a predetermined region of a display unit of the wireless terminal, when a menu view is selected while displaying the content of the selected channel;
    wherein the controlling of the output through the external device comprises:
        upon selection of external device power-on and channel shift from the at least one menu, switching to a remote control mode; and
        automatically powering on the external device in the remote control mode.

10. The method of claim 9, further comprising:
    upon selection of external device channel shift from the at least one menu, switching to the remote control mode; and
    controlling the external device to change channels.

11. The method of claim 9, further comprising:
    upon selection of external device manual channel from the at least one menu, switching to the remote control mode; and
    controlling the external device to switch to a preset channel or a channel input by a user.

12. The method of claim 8, wherein the content is displayed in a broadcast mode of the wireless terminal, and the broadcast mode comprises a Digital Multimedia Broadcasting (DMB) mode or a radio mode.

13. The method of claim 9, further comprising:
    upon selection of external device output from the at least one menu when content is output in a content output mode of the wireless terminal, switching to a remote control mode; and
    controlling the content output through the external device.

14. The method of claim 13, wherein the content of the selected channel is video data or audio data.

15. The wireless terminal of claim 1, wherein a menu view is selected during displaying of the content in full screen.

16. The method of claim 8, wherein a menu view is selected during displaying of the content in full screen.

* * * * *